(12) United States Patent
Simon et al.

(10) Patent No.: US 6,935,513 B2
(45) Date of Patent: Aug. 30, 2005

(54) METHOD AND APPARATUS FOR MIXTURE SEPARATION

(75) Inventors: Wayne E. Simon, Evergreen, CO (US); Jackie O. Bunting, Fraser, CO (US)

(73) Assignee: Molecular Separation Technologies, LLC, Fraser, CO (US)

( * ) Notice: Subject to any disclaimer, the term of this patent is extended or adjusted under 35 U.S.C. 154(b) by 76 days.

(21) Appl. No.: 10/325,471

(22) Filed: Dec. 18, 2002

(65) Prior Publication Data

US 2004/0118752 A1 Jun. 24, 2004

(51) Int. Cl.$^7$ .............................. B04C 5/00; B04C 3/06
(52) U.S. Cl. ...................... 209/717; 209/150; 209/711; 209/721
(58) Field of Search ................................ 209/135, 137, 209/139.1, 140, 143, 710, 711, 715, 717, 719–722, 150, 157, 725, 727, 728, 732–734; 210/787, 788

(56) References Cited

U.S. PATENT DOCUMENTS

| | | | | |
|---|---|---|---|---|
| 3,052,361 A | * | 9/1962 | Whatley et al. | 210/512.2 |
| 3,504,804 A | * | 4/1970 | Arnold et al. | 210/512.1 |
| 4,212,653 A | * | 7/1980 | Giles | 95/271 |
| 4,245,961 A | | 1/1981 | Bunting et al. | |
| 4,388,045 A | | 6/1983 | Simon | |
| 4,414,112 A | | 11/1983 | Simpson et al. | |
| 4,801,310 A | * | 1/1989 | Bielefeldt | 210/788 |
| 4,859,347 A | | 8/1989 | Simon et al. | |
| 5,016,823 A | * | 5/1991 | Kato et al. | 241/5 |
| 5,106,514 A | * | 4/1992 | Alexander | 210/788 |
| 5,651,466 A | * | 7/1997 | Satomi | 209/734 |
| 2004/0140273 A1 | * | 7/2004 | Arnaud | 210/788 |

FOREIGN PATENT DOCUMENTS

| | | |
|---|---|---|
| DE | 1154793 | 9/1963 |
| WO | WO 00/56460 | 9/2000 |

OTHER PUBLICATIONS

"Vortoil™ Separators for Treating Oily Water," *International Journal of Ocean Business*, A PennWell Publishing Company, (Sep. 1985), 10 pages.
Burke, Robert G., "Cleanup of Oil Water Poses a Challenge," *Offshore*, PennWell Publishing Company, 4 pages.
Burke, Robert G., "Taking an Oil Tool from Research to Field Use," *Offshore*, PennWell Publishing Company, (Sep. 1985), 1 page.
Hayes, John J. et al. "Hydroclones for Treating Oily Water: Development and Field Testing in Bass Strait," Offshore Technology Conference, (May 6–9, 1985), pp. 549–553 with 3 sheets of drawings.
Hayes, John J., "Bass Strait Water Handling Developments," *The APEA Journal*, (1985), pp. 114–118.
"How to Prevent a Helium Crunch," *Businessweek*, (Feb. 1974), p. 8.
Auvil, Steven R. et al., "The Steady and Unsteady State Analysis of Simple Gas Centrifuge," *AiChE Journal*, vol. 22, No. 3, (May 1976), pp. 564–568.

* cited by examiner

*Primary Examiner*—Donald P. Walsh
*Assistant Examiner*—Joseph C Rodriguez
(74) *Attorney, Agent, or Firm*—Altera Law Group, LLC

(57) ABSTRACT

A separator that provides a convergent conical flow path for a mixture introduced into the separator at fairly high velocity. Within the convergent flow path, the angular velocity of the spiraling mixture increases such that heavier species are segregated from lighter species. The convergent flow path transitions into a substantially uniform flow path where the spiraling mixture maintains a fairly uniform velocity and further separation occurs. The uniform flow path then transitions to a divergent conical exhaust flow path where some or all of the heavier species are exhausted from the separator. Within the substantially uniform flow path, a retrograde flow of the lighter species is created with an interaction with a diffuser surface arranged in the exhaust flow path. As such, the lighter species are channeled to a separate exit port to provide some degree of separation of the mixture.

7 Claims, 7 Drawing Sheets

METHOD AND APPARATUS FOR MIXTURE SEPARATION

FIELD OF THE INVENTION

The present invention generally pertains to the field of separating components of a mixture, and more particularly to a device that provides for the formation of a generally spiraling flow.

BACKGROUND OF THE INVENTION

There are numerous situations where it is desirable to separate component parts of a mixture. For example, subquality natural gas wells typically contain the sought after natural gas ($CH_4$) along with contaminants such as carbon dioxide ($CO_2$), Nitrogen ($N_2$), and hydrogen sulfide ($H_2S$). By some estimates, the United States has trillions of cubic fee of subquality natural gas that requires processing to separate out the contaminants from the natural gas. In another example, water sources, such as retention ponds, abandoned mines, reservoirs, lakes, seas, and the like, may contain various substances such as salt, arsenic, iron, copper, lead, zinc, cadmium, other metals, and fertilizer and insecticide run off. Such substances can render the water source unusable, and can seep into the water table and have devastating affects on water quality over broad geographic areas.

Numerous conventional devices exist that can separate components of a mixture. Many conventional devices, however, are burdened with various deficiencies, such as high cost, installation complication, maintenance costs and frequency, and remote location deployment. For example, current sour natural gas separation technology may be characterized as a small processing facility that uses filtration and chemical treatment and requires a continuous source of power, and that is expensive to deploy and maintain. In many remote sour gas well locations, such conventional technology can be prohibitively expensive to install and operate. As a result, many gas wells with potentially good yields cannot be brought into production.

It is with this background in mind that the various embodiments of the present invention were developed.

SUMMARY

Various embodiments of a separator conforming to the present invention provide an efficient, cost effective, readily deployable, device capable of separating numerous different mixtures ranging from mixtures of liquids, gases, solids and combinations thereof. In the example of a mixture of gases, separation may be performed at the molecular levels such that various molecular species may be separated and extracted from the mixture.

Generally speaking, in operation of a separator in conformance with aspects of the invention, a mixture is transmitted into the separator typically at a high velocity. Within the separator, the mixture initially flows through a converging funnel-like chamber and forms a convergent spiraling flow. As the mixture spirals and converges, forces cause separation of the components of the mixture. In some implementations of the invention, the convergent spiraling flow then transitions into a throat section with a generally uniform radius and the mixture continues to spiral and separate further. Within the throat section, the heavier components of the mixture tend to congregate toward the outer portions of the spiraling flow and the lighter components of the mixture tend to congregate in a generally cylindrical inner spiraling flow area within the outer spiraling flow of heavier components. The spiraling flow then transitions to a divergent funnel-like chamber where some portion of the heavier components of the mixture are exhausted from the separator. A portion of the lighter components of the mixture form a retrograde flow within the throat section and are exhausted through an exit port formed generally coaxially with the convergent funnel-like input chamber. Further separation occurs in the throat section.

Some embodiments of the separator may be deployed in the field without a single moving part. In other instances, a screw motor may be employed to adjust a portion of the separator to finely tune the separation process. In areas without a power source, the screw motor may be readily replaced with a hand operated alternative. For embodiments employed to obtain natural gas from sour wells, in some instances, the separator may be deployed at the well without any power and utilize the natural pressure of the gas within the well to feed the gas into the separator. In other instances, besides the separator, only a source of pressure for the gas may be required which is oftentimes already present at the well head. Thus, as will be further realized from the detailed discussion below, a separator conforming to the present invention may be readily deployed in the field, in many instances regardless of the infrastructure facilities present where the separator is deployed, and little or no maintenance of the separator is required.

In one embodiment of a separator in accordance with the present inventions, a separator comprises an inlet chamber defining a convergent conical flow path and a diffuser chamber in fluid communication with the inlet chamber, the diffuser chamber defining a substantially divergent conical flow path. An outlet port defining a substantially cylindrical channel is arranged substantially coaxially with the inlet chamber, and a diffuser surface arranged substantially coaxially with the diffuser chamber. The separator may additionally comprise a throat portion defining a second substantially cylindrical channel, the throat section connected between the inlet chamber and the diffuser chamber.

In one particular implementation, an exhaust cone defines the diffuser surface and the exhaust cone is movably connected with the diffuser chamber. The exhaust cone is movable relatively with regard to the throat section. The exhaust cone cooperates with the diffuser chamber to define a divergent conical channel for the divergent conical flow path.

In another particular implementation, the separator further comprises an inlet cone disposed within the inlet chamber. The inlet cone defines the outlet port. The inlet cone cooperates with the inlet chamber to define a convergent conical channel for the convergent conical flow path.

Generally, the inlet chamber comprises means for defining a convergent spiraling flow path; the diffuser chamber comprises means for defining a divergent spiraling exhaust flow path; and the outlet port comprises means for defining a retrograde exit flow path.

To provide the mixture into the separator, in one particular implementation the molecular separator further comprises a plenum comprising a first annular channel defining at least one input port; a second annular channel fluidly connected with the inlet first chamber; and at least one transfer port connected at an acute angle between the first annular channel and the second annular channel.

The at least one input port may be radially disposed to the first annular channel. Alternatively, the at least one input port is tangentially disposed to the first annular channel. In one particular implementation, the at least one transfer port comprises four transfer ports circumferentially disposed between the first annular channel and the second annular channel at about 90 degree intervals.

In another embodiment of a separator in accordance with the present invention, a separator comprises a first chamber defining a convergent substantially conical fluid path from a relatively large diameter inlet region to a relatively small diameter outlet region. The separator further comprises a second chamber defining a divergent substantially conical fluid path from a relatively small diameter inlet region to a relatively large outlet region, the inlet region of the second chamber being in fluid communication with the outlet region of the first chamber. A fluid inlet is provided that is in fluid communication with the inlet region of the first chamber. For output, a first fluid outlet is in fluid communication with the outlet region of the second chamber; and a second fluid outlet disposed at least in part within the first chamber and defining an orifice disposed in proximity to the outlet region of the first chamber.

In one particular implementation, the fluid inlet comprises a plenum having a first annular channel defining a fluid inlet port; a second annular channel in fluid communication with the first annular channel and with the inlet region of the first chamber; and a plurality of channels disposed between the first annular channel and the second annular channel and respectively disposed at acute angles relative to the second annular channel. The second fluid outlet comprises a cylindrical passageway coaxially disposed within the conical body.

In one particular implementation, the separator further comprises a third substantially cylindrical chamber disposed between and in fluid communication with the outlet region of the first chamber and the inlet region of the second chamber, the orifice of the second fluid outlet being an end of the cylindrical passageway disposed within the third chamber. Alternatively, the separator further comprises a third substantially cylindrical chamber disposed between and in fluid communication with the outlet region of the first chamber and the inlet region of the second chamber, the orifice of the second fluid outlet being an end of the cylindrical passageway disposed outside of the third chamber. In yet another alternative, the separator further comprises a third substantially cylindrical chamber disposed between and in fluid communication with the outlet region of the first chamber and the inlet region of the second chamber, the third chamber forming a junction with the outlet region of the first chamber and the orifice of the second fluid outlet being an end of the cylindrical passageway disposed substantially at the junction.

In some implementation, the separator may comprise an actuator for controllably positioning the conical body in a plurality of different spaced-apart relationships with respect to the wall of the second chamber.

In another embodiment of a separator in accordance with the present invention, a separator comprises an input section defining a conical chamber with an outlet; a first output section defining a second conical chamber, the first output section comprising a diffuser surface, the first output section connected with the outlet of the input section; and a second output section defining a channel with an inlet arranged adjacent with the outlet of the input section, the inlet further arranged adjacent the diffuser surface of the first output section. In some implementations, the separator may further comprise a tube interposed between the input section and the first output section. The tube may define an inlet and a second outlet, and wherein the inlet is coupled with the outlet of the input section and the second outlet is coupled with the first output section. The second outlet of the tube, in some instances, is disposed adjacent the diffuser surface.

In some particular implementations, the separator may further comprise a diffuser cone movably supported within at least a portion of the second conical chamber, the diffuser cone defining the diffuser surface.

In some particular implementations, the input section may define a first conical channel and the first output section may define a second conical channel. The first conical channel provides a constrained convergent conical flow path toward the second conical channel and the second conical channel provides a constrained divergent conical flow path away from the first conical channel.

Generally, the input section comprises means for providing a convergent conical flow path; the output section comprises means for providing a divergent conical exhaust flow path; and the second output section comprises means for providing a retrograde exit flow path. The tube comprises means for providing an exhaust flow path and a retrograde flow path.

In another particular implementation of the present invention, a separator for partially or completely separating components of a mixture comprises a plenum; a first chamber defining a convergent flow path; a second chamber fluidly connected with the first chamber, the first chamber defining a divergent exhaust flow path; an exit channel operably associated with the first chamber and the second chamber. The plenum may further comprise a first annular channel defining at least one input port; a second annular channel fluidly connected with the first chamber; and at least one transfer port connected between the first annular channel and the second annular channel at an acute angle. Generally, the plenum is configured to provide a circular flow of the mixture.

In another particular implementation, the second chamber further comprises a diffuser cone. The diffuser cone is arranged to provide divergent exhaust flow path that is confined within a divergent conical channel.

In another particular implementation, the first chamber further comprises an inlet cone. The inlet cone is arranged to provide a convergent flow path that is confined within a convergent conical channel.

An embodiment in accordance with the present invention also includes a method of separating a mixture into components, the method comprising the operations of: confining the mixture into a convergent conical flow wherein the mixture separates into an external spiraling flow comprising a relatively heavy molecular weight component and an internal spiraling flow comprising a relatively light molecular weight component; diffusing the external spiraling flow to obtain a first exhaust flow; impeding the internal spiraling flow to obtain a retrograde spiraling flow; and channeling the retrograde spiraling flow to obtain a second exhaust flow.

In particular implementations the method may further comprise the operations of: monitoring at least one of the first exhaust flow and the second exhaust flow; and in response to the monitoring, modifying at least one of the impedance of the internal spiraling flow and the convergent conical flow. The method may further comprise directing the external spiraling flow, the internal spiraling flow, and the retrograde flow concurrently through an elongated channel. Moreover, the elongated channel may have a variable length, and the method may further comprise: monitoring at least one of the first exhaust flow and the second exhaust flow; and in response to the monitoring step, modifying the variable length of the elongated channel.

Other features, utilities and advantages of the various embodiments of the invention will be apparent from the following more particular description of embodiments of the invention as illustrated in the accompanying drawings.

DESCRIPTION OF THE DRAWINGS

The detailed description will refer to the following drawings, wherein like numerals refer to like elements, and wherein.

DETAILED DESCRIPTION OF EMBODIMENTS OF THE INVENTION

A separator 10 conforming to the present invention is useful for partially or completely separating components of a mixture. Illustratively, a separator conforming to the present invention might be employed to process a fluid composition of gases in a subquality natural gas well to partially or completely separate contaminant gases, such as carbon dioxide, nitrogen, and hydrogen sulfide, from the sought after natural gas, to process a saltwater solution to separate the sodium chloride (salt) from the water, separate well streams of oil and gas, and process contaminated water sources to separate the contaminants, such as arsenic, cadmium, copper, iron, lead, zinc, other metals, chemical compositions, and dissolved gases, from the water.

Figure 1:
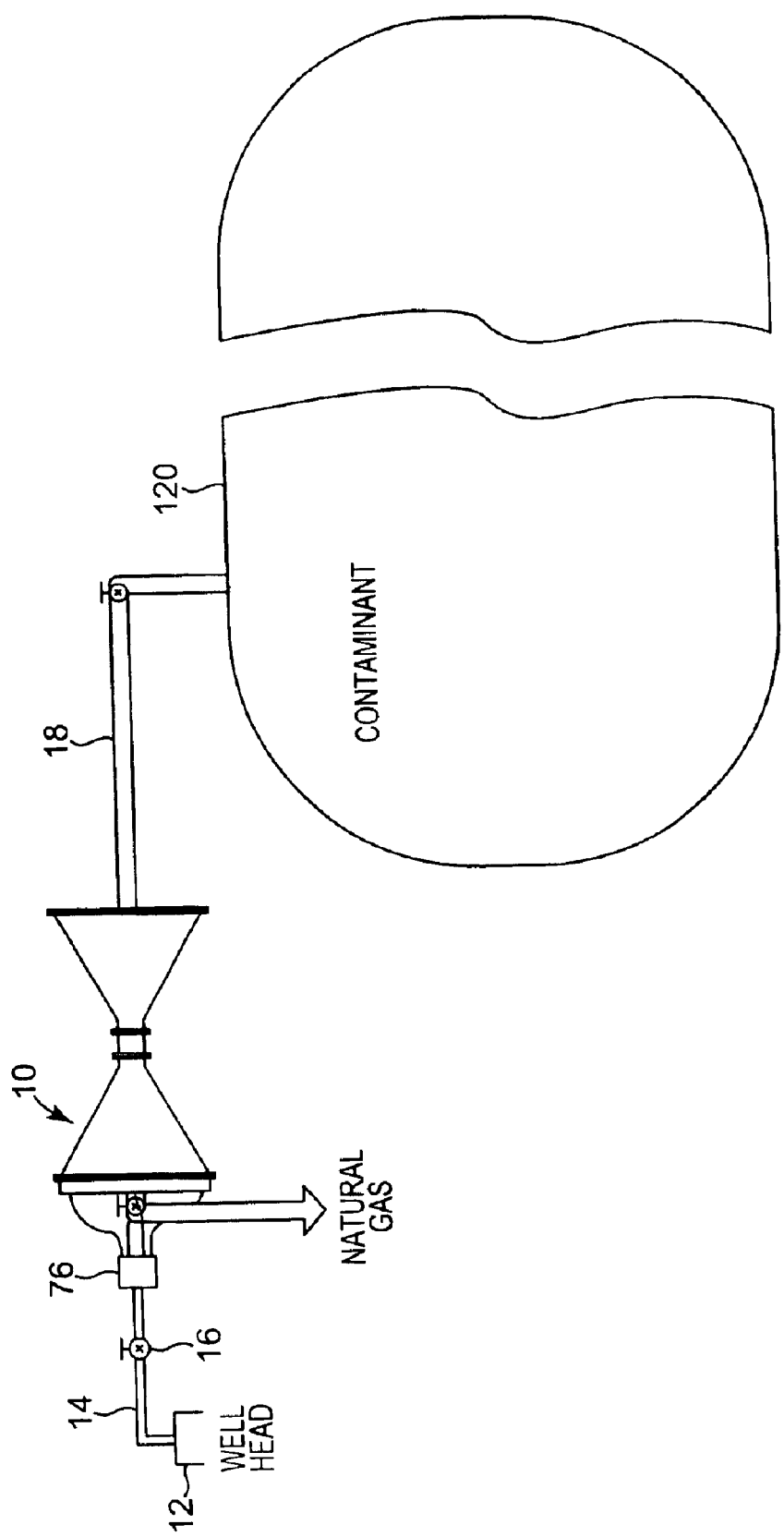
FIG. 1 is a diagram illustrating an embodiment of the invention for use in separating natural gas from contaminants in a subquality natural gas well.

FIG. 1 is a diagram depicting the separator 10 connected with a subquality or "sour" natural gas well 12. In an application for processing sour natural gas wells, the separator is connected with the outlet 14 of a natural gas well. When the natural gas at the wellhead is under sufficient pressure, the separator may be connected directly with the wellhead by way of a valve 16. In other instances, the separator is connected to a compressor (not shown) that provides natural gas from the well at a higher pressure than the pressure provided directly from the well. Such compressors are commonly used to distribute and transport natural gas to pipelines and thus are readily available at many wells. The high pressure natural gas mixture is transmitted into the separator, where it forms a tornado-like or spiraling flow due to the characterisitcs of the separator. The tornado-like flow causes one or more of the components of the mixture to separate partially or completely. From the separator, contaminants such as $N_2$, $H_2S$, and $CO_2$, and perhaps a small portion of $CH_4$, are expelled from an exhaust pipe 18 of the separator, and the cleansed natural gas is provided to a natural gas pipeline, to a storage tank, to some other destination, or to one or more additional separators for further processing. If need be, the separated natural gas may be transmitted to an additional compressor for transportation to a pipeline. Advantageously, the separator is primarily made of non-moving parts and thus is readily and efficiently employed in nearly any sour gas well location and requires little maintenance or adjustment.

Figure 2:
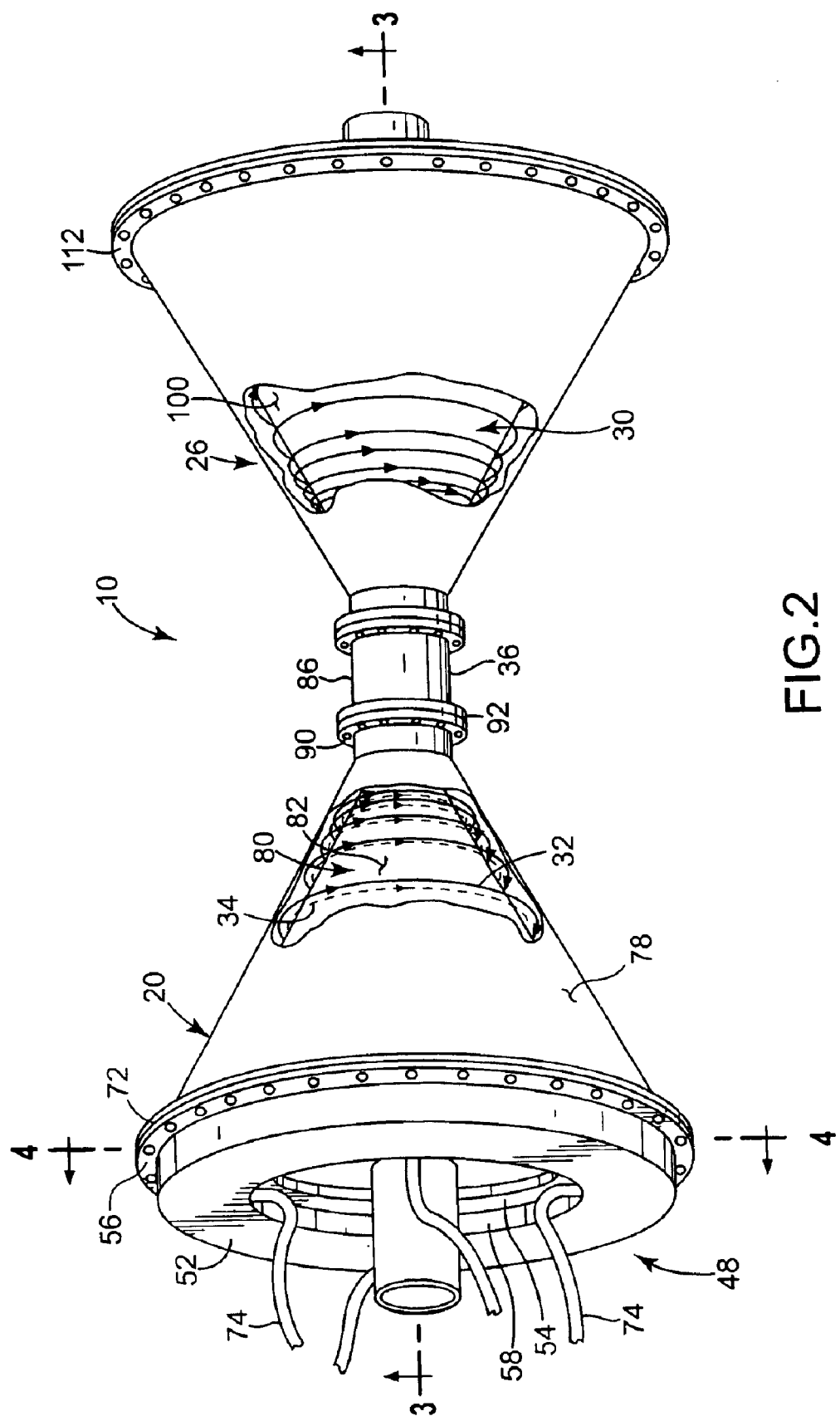
FIG. 2 is a perspective view of one embodiment a separator, in accordance with the present invention.

FIG. 2 is a perspective view of one embodiment of a mixture separator 10 that provides for the formation of a converging spiraling inflow of a mixture to separate components, a divergent exhaust flow of some components, and a retrograde exhaust flow of other components. Generally, the combination of the convergent spiraling inflow of mixture and the spiraling retrograde exit flow of one or more separated components of the mixture may together be considered as a tornado-like flow.

Figure 3:
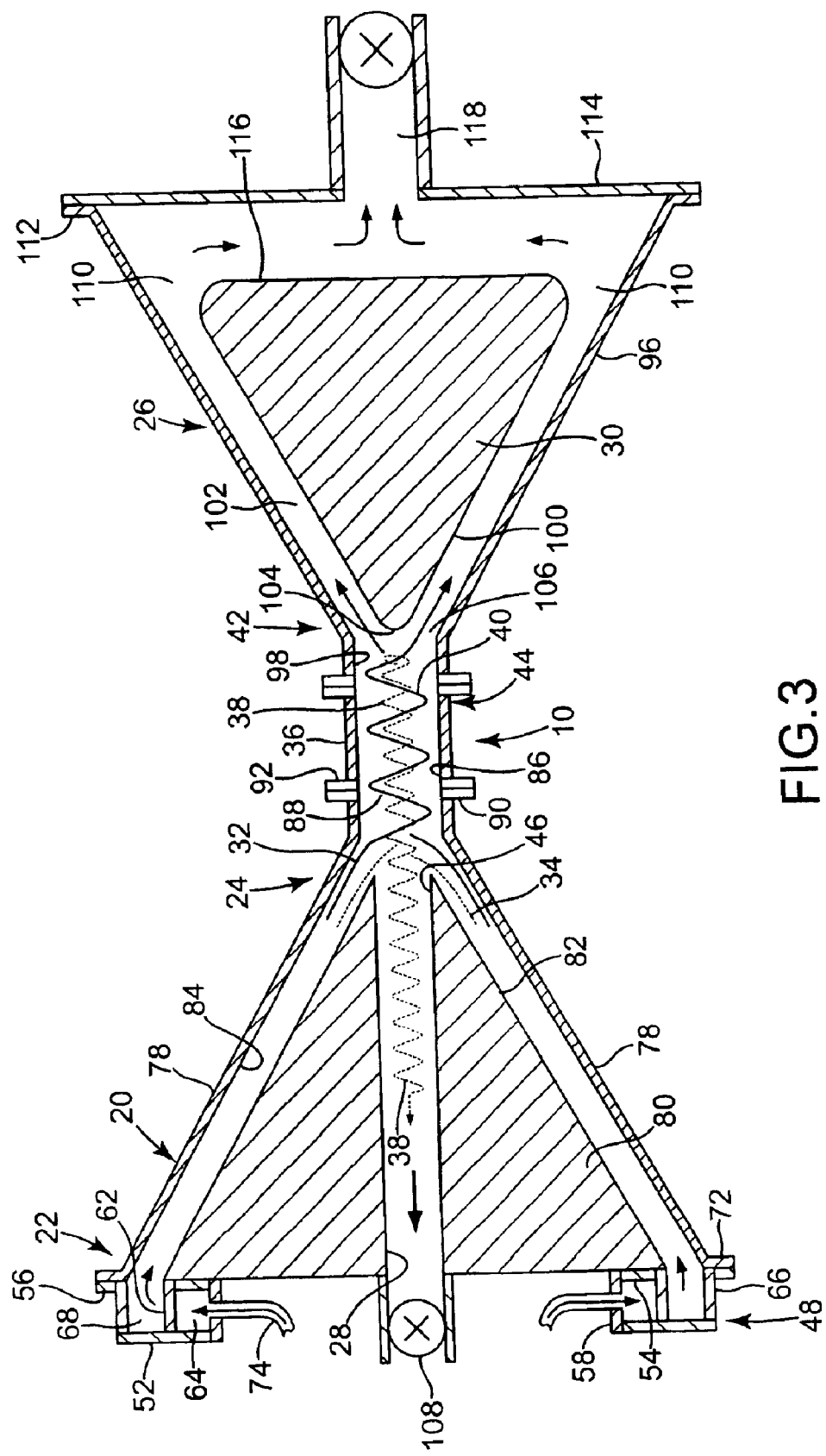
FIG. 3 is a section view of the separator taken along line 3—3 of FIG. 2.
Figure 4:
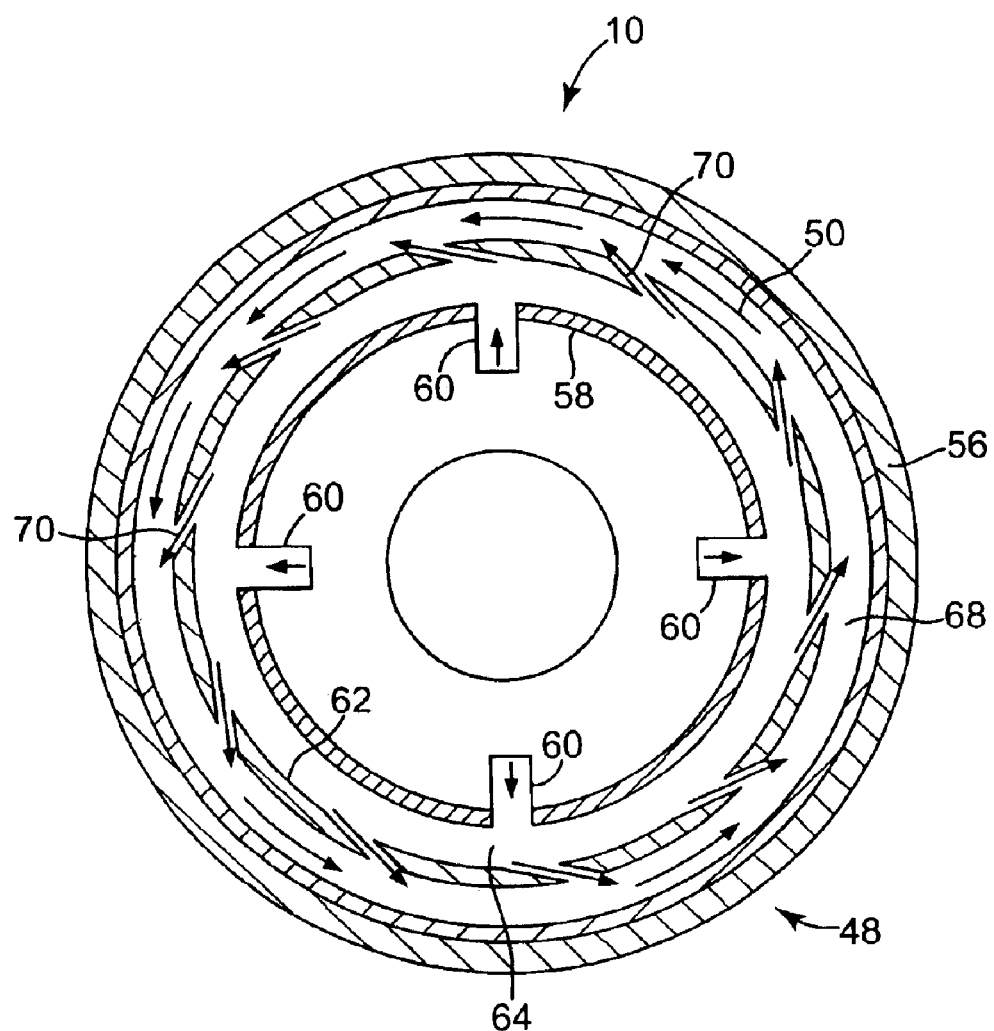
FIG. 4 is a section view of the separator taken along line 4—4 of FIG. 2.

FIG. 3 is a section view of the separator taken along line 3—3 of FIG. 2, and FIG. 4 is a section view of the separator taken along line 4—4 of FIG. 2. Generally, the separator has an inlet chamber 20 that converges from an inlet portion 22 toward a lesser diameter outlet portion 24. The outlet portion is connected with a diverging diffuser chamber 26. An exit channel 28 is disposed within the inlet chamber 20. A diffuser cone 30 is disposed within the diffuser chamber. The separator 10 may be constructed of any material suitable to withstand the forces within the separator and the corrosive or other damaging effect of the mixture being separated. Such materials include stainless steel, alloys, polymers, or other composite resin type materials.

In operation, a mixture of gases, liquids, solids, or any combination thereof is introduced at high velocity into the inlet portion 22 of the inlet chamber. The mixture spirals through the converging inlet chamber 20 from the inlet portion toward the outlet portion 24. As the mixture spins through the chamber its angular velocity increases partially as a function of the convergent angle of the inlet chamber. Upon reaching the outlet portion of the inlet chamber some or all of the separation of the mixture will have occurred. Generally, the angular velocity of the mixture through the convergent inlet chamber causes the mixture to separate such that the higher mass components (illustrated as solid arrowed line 32 in FIG. 2) of the mixture are located toward the outer most portion of the flow and the lower mass components (illustrated as dashed arrowed line 34 in FIG. 2) of the mixture are located toward the inner portion of the flow. In some instances, the spiraling flow will comprise roughly defined stratified layers of decreasing mass components located radially inward from a highest mass outer layer. In a configuration adapted to separate a mixture in accordance with molecular mass, during separation the highest mass molecular species will migrate toward the outer portions of the flow causing a separation such that lower molecular mass species will be constrained inwardly of the higher molecular mass species.

The inlet chamber 20 may be directly connected with the diffuser chamber 26. In one particular embodiment of the invention, a throat section 36 defining a substantially cylindrical chamber is interposed between the inlet chamber and the diffuser chamber. Thus, the mixture spins out of the outlet portion 24 of the inlet chamber and into the throat section 36. Within the throat section, further separation of the mixture occurs as the mixture spins through the throat toward the diffuser chamber. Also, within the throat section, a spiraling retrograde flow is formed primarily of lighter components. The retrograde flow (illustrated in FIG. 3 as a dashed line 38 within the throat section and exit channel 28)

is generally within a larger diameter exhaust flow (illustrated in FIG. 3 as a solid line 40 within the throat section) of heavier components. Along the retrograde flow, further separation occurs such that some heavier components separate, change direction, and merge into the exhaust flow 40.

The diffuser chamber 26 defines a divergent exhaust chamber in communication with the throat section 36. The exhaust chamber is arranged such that it defines an input port 42 connected with the output portion 44 of the throat. The exhaust cone 30 is located within the diffuser chamber and generally adjacent the output portion of the throat. The exhaust cone is arranged along the longitudinal axis of the throat section. With such an arrangement, within the throat the exhaust flow of the heavier mass components of the mixture into the diffuser chamber is promoted and the flow of the lower molecular mass components toward the diffuser chamber is interrupted by the exhaust cone.

As mentioned above, the exit channel 28, preferably a cylindrical tube, is disposed within the inlet chamber 20. In addition, the exit channel preferably is disposed along the axis of the throat section 36 and the inlet 46 of the exit cylinder is in fluid communication with the throat. Upon interaction with the exhaust cone 30, the lower molecular mass components, in part, form the generally retrograde flow 38 to the overall spinning and flowing of the mixture 40 between the inlet chamber 20 and through the throat towards the diffuser. In the case of the separator 10 being used to process natural gas from a sour well, the heavier contaminants such as $CO_2$, $N_2$, and $H_2S$ are expelled through the exhaust, while the lighter natural gas component is separated in the inlet chamber and throat, forms a retrograde flow, further separates within the retrograde flow through the throat, and flows through the exit channel 28.

As will be recognized from the discussion above, depending on the processing needs of any particular application, a plurality of separators 10 may be connected with a mixture source in a serial arrangement, a parallel arrangement or a combination of serial and parallel arrangements, to process the mixture. For example, separators may be arranged in parallel to process large volumes of a mixture. Or, the scale of the separator may be modified in accordance with the volumetric processing requirements. Alternatively, separators may be arranged in a serial configuration to achieve further separation of a target component of a mixture or to focus separation on particular components of a mixture. For example, in the case of a mixture of $CH_4$, $N_2$, and $H_2S$, there may be a need to individually separate each component of the mixture, i.e., the $CH_4$, the $N_2$, and the $H_2S$ from the mixture. In a serial configuration, the first separator may be configured to separate the natural gas from the mixture, which is the lightest molecular mass component. The remaining mixture, which would be predominantly a mixture of $H_2S$ and $N_2$, might be further processed by a second separator configured to extract the $N_2$ from the $H_2S$. Separators may also be arranged serially when incomplete separation occurs in a single separator. For example, a first separator may be capable of processing a water source such that the presence of metals is reduced from 20,000 parts per million (ppm) in the source to 5,000 ppm after processing. Additional separators may be employed to further process the water such that the ppm of metals is further reduced.

Embodiments of a separator 10 in accordance with the present invention will now be described in greater detail. In one particular implementation of the present invention, a plenum 48 is connected with the inlet chamber 20. FIG. 4 illustrates a section view of the plenum taken along line 4—4 of FIG. 3. The mixture is fed into the plenum where a high velocity circular flow 50 is begun and communicated into the inlet chamber to form an accelerating convergent spiraling flow (32, 34). In any implementation of a separator 10, the mixture should be fed into the plenum at a velocity such that the velocity of the spiraling flow through the separator does not meet or exceed the speed of sound. In one example, the mixture is fed into the plenum such that the mixture has an angular velocity within the inlet chamber 20 adjacent the throat 36 of about 0.5 mach.

The plenum comprises a disk-shaped back plate 52, a disk-shaped face plate 54, a disk-shaped flange 56, and a plurality of circumferential side walls. An inner circumferential side wall 58 defines one or more inlet ports 60 for receiving the mixture from its source. The inner circumferential side wall is connected between the back plate and the face plate. In the embodiment illustrated in FIG. 4, the inner side wall defines four inlet ports circumferentially separated by about 90 degrees. More or less inlet ports may be provided as needed. In addition, the inlet ports may be located elsewhere. For example, one or more inlet ports may be defined in or connected with the disk-shaped back plate 52. In FIG. 4 the inlet ports are shown radially disposed to the inner circumferential side wall 58. In some embodiments, the inlet ports may be disposed at an angle or tangentially with the inner side wall to help facilitate a high velocity circular flow within the inlet plenum.

A second or middle circumferential side wall 62 is also connected between the disk-shaped back plate 52 and the face plate 54. The second circumferential side wall has a larger diameter than the inner circumferential side wall 58. An annular channel 64 is defined between the inner 58 and second 62 circumferential side walls and between the back 52 and face 54 plates. An outer circumferential side wall 66 is connected between the disk-shaped back plate and the disk-shaped mounting flange 56. The outer circumferential side wall has a larger diameter than the second circumferential side wall. A second annular channel 68 is defined between the outer circumferential side wall 66, the middle circumferential side wall 62 and the back plate 54. The second annular channel is in communication with the inlet chamber 20.

The middle circumferential wall 62 defines one or more transfer ports 70 between the first annular channel 64 and the second annular channel 68. In one implementation, the transfer ports define a rectangular cross section and are disposed at an acute angle between the first and second annular channels. The mixture first flows through the inlet ports into the first annular channel 64 under high pressure and then flows through the transfer ports 70 into the second annular channel 68. From the perspective of the cross section of the inlet plenum illustrated in FIG. 4, the high pressure of the mixture within the first annual channel causes the mixture to develop a high velocity counterclockwise circular flow 50 within the second annular channel as it is forced through the angled transfer ports.

The second annular channel 68 is in fluid communication with the inlet portion 22 of the inlet chamber 20. In one implementation, the inlet portion defines a second disk-shaped flange 72 adapted to cooperate and connect with the first disk-shaped flange 56 of the inlet plenum 48 for attachment of the plenum to the inlet chamber. The first and second disk-shaped flanges define a plurality of aligned apertures adapted to receive a plurality of nuts and bolts to secure the plenum to the inlet chamber. Although not shown, to help ensure a seal that can withstand the pressure of the mixture within the separator, one or more o-rings may be disposed between the flanges. The o-rings may be secured in cooperating circumferential channels defined in the abutting portions of the flanges. Alternatively, a high pressure gasket may be provided between the flanges. In another alternative, the first and second flanges may be seam welded to secure the plenum to the inlet section. A seam weld would help ensure a seal between the plenum and the inlet chamber of the separator, but would make disassembly of the separator more difficult.

In an embodiment of the separator 10 with four inlet ports 60, the mixture is fed to the ports through four corresponding pipes or hoses 74. As shown in FIG. 1, in one implementation, a single pipe 14 or hose conveying the mixture from its source is connected with a splitter 76. The splitter has one inlet connected with the pipe and four outlets connected with the four corresponding hoses that are connected with the four inlet parts to the plenum.

The high velocity circular flow of the mixture that is begun in the second annular channel 68 flows into the inlet portion 22 of the inlet chamber 20 to form a convergent spiraling flow (32, 34) therein. The inlet chamber is conical with the chamber forming a converging path for the flow from the inlet portion toward the outlet portion 24. An outer continuous conical side wall 78 defines the outside wall of the conical inlet chamber. The diameter of the outer side wall adjacent the plenum 48 is about the same diameter as the outer circumferential side wall 66 of the plenum to provide a smooth transition along the outside wall of the plenum to the outside wall of the inlet chamber. Generally, the flow path of the mixture through the separator should be smooth to provide a non-turbulent laminar-like flow of the mixture.

In one particular implementation of the present invention, the inlet chamber further comprises an inlet cone 80 disposed within the converging conical chamber 20. The inlet cone comprises a continuous inner conical side wall 82 arranged to cooperate with the outer conical side wall 78 of the chamber to define a conical channel 84 therebetween. In one implementation, the inner conical side wall 82 of the inlet cone abuts the plenum 48 in alignment with the middle side wall 62. The inner conical side wall adjacent the inlet plenum has a diameter about the same as the second circumferential side wall to provide a smooth transition of the mixture as it flows over the seam between the second side wall of the plenum and the inner conical side wall. With the outer conical side wall of the inlet chamber abutting the outer circumferential wall of the plenum and the inner conical side wall of the plenum abutting the middle circumferential wall, it can be seen that the second annular channel 68 of the plenum defines a circumferential opening into the conical channel 84 that is about the same size as the distance between the outer and inner conical side walls, which provides a smooth transition between the second annular channel and the conical channel. As mentioned above, the smooth transition helps to avoid disturbances in the flow, which can disrupt the separation of the mixture.

The conical channel 84 provided, in part, by the inlet cone 80 reduces disturbances to the diverging spiral flow of the mixture through the conical channel. In embodiments of a separator 10 without the inlet cone, the flow of the mixture from the second annular channel 68 of the plenum 48 into the conical inlet chamber 20 may be disturbed by the rapid volumetric difference between the second annular channel and the conical chamber, which may result in pressure fluctuations. Such pressure disturbances, can result in less efficient separation of components of the mixture within the inlet chamber. The presence of the cone 80 can reduce the length of the inlet chamber as compared to embodiments that do not include a cone or do not define a conical inlet channel by other means. Nonetheless, alternative embodiments of a separator may not employ an inlet cone.

As the mixture spins through the conical channel, heavier species 32 are generally segregated toward the outer side wall 78 and lighter species 34 are generally segregated toward the inner side wall 82. In the case of a mixture containing two species, the heavier species will migrate toward the outer side wall and the lighter species will migrate toward the inner side wall. In the case of a mixture with more than two components or species, as the mixture flows around and through the conical chamber 20, stratified bands of at least some of the components are formed with the heaviest species or component in the outer band adjacent the outer wall, the lighter components forming bands inwardly from the outer band, and the lightest component forming a band adjacent the inner conical side wall. The amount of separation between the species will depend, in part, on the input velocity of the mixture into the conical channel 84, the differences in mass between the species or components, the difference in specific gravity between the components, the difference in atomic number between the components, the existence and strength of any chemical bond, and the angle of convergence of the conical channel. Thus, varying degrees of separation will be achieved within the inlet chamber 20.

Figure 5:
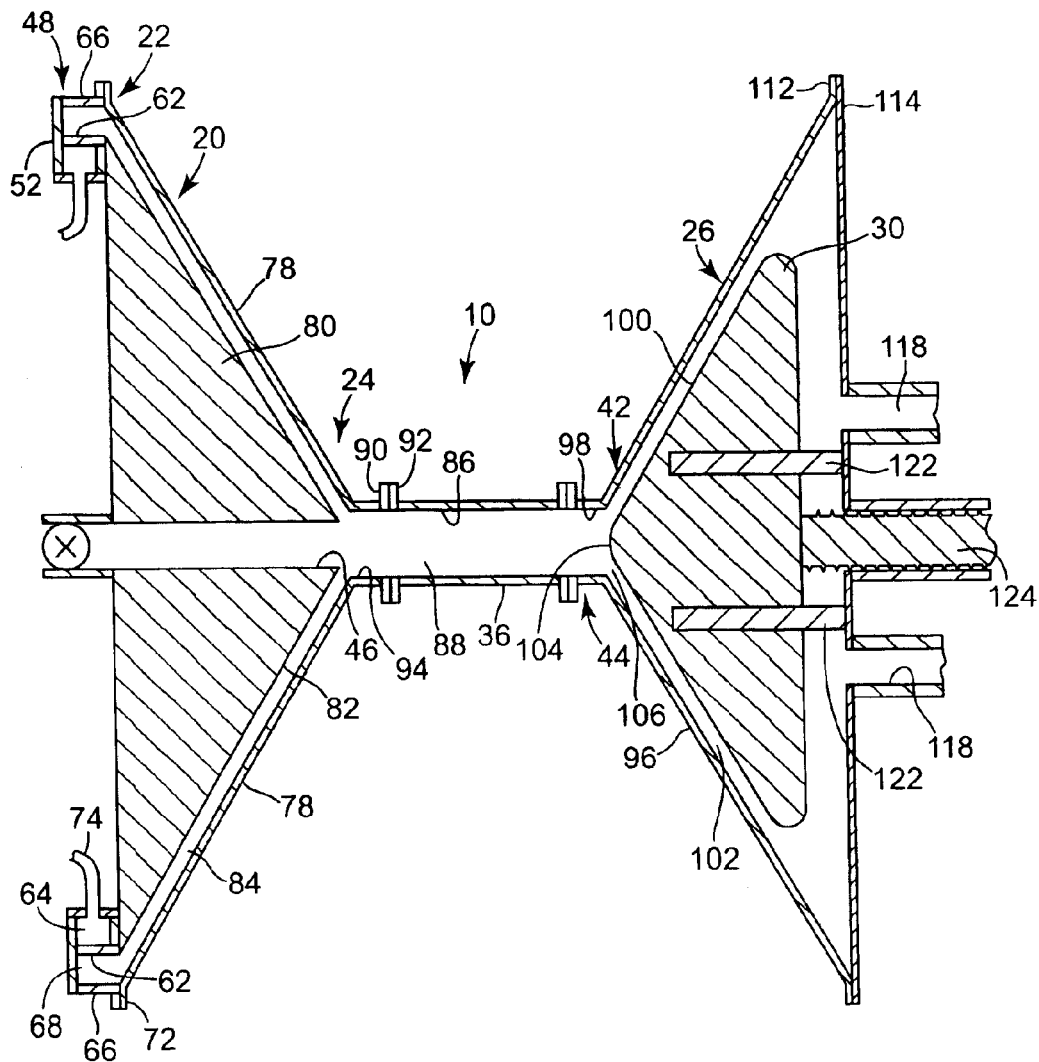
FIG. 5 is a section view an alternative embodiment of a separator, in accordance with the present invention.

With respect to the overall longitudinal axis of the separator 10, the conical channel 84 may be arranged at any acute angle thereto. In one preferable range of implementations, the conical channel is arranged at an angle of between 15 and 60 degrees with respect to the longitudinal axis. The embodiment of the separator illustrated in FIGS. 2 and 3, shows the conical channel 84 at an angle of about 15 degrees and the embodiment of the separator illustrated in FIG. 5 shows the conical channel 84 at an angle of 60 degrees. In most instances, assuming the same mixture components and portions, and the same input pressure, more separation will occur over a shorter length for a separator with a higher angle conical channel as compared to a separator with a lesser angle conical channel.

The mixture separates into component parts or species along the length of the conical channel 84 as the mixture converges toward the outlet portion 24 of the channel adjacent the throat 36. As mentioned above, in some implementations the outlet of the conical channel of the inlet chamber may be connected directly to the diffuser chamber 26. In one particular embodiment of the separator, the outlet portion is in fluid communication with the throat section. The throat section includes an outer side wall 86 defining a cylindrical channel 88. In one embodiment, a disk-shaped mounting flange 90 is connected with the separator 10 adjacent the outlet portion 22 of the inlet chamber. The mounting flange is adapted to cooperate with a corresponding disk-shaped mounting flange 92 extending radially from the throat. Each mounting flange defines a plurality of apertures adapted to receive a nut and bolt arrangement to secure the throat to the inlet chamber. As with the mounting flanges on the plenum 48 and inlet portion 22 of the chamber, a variety of leak prevention means, such as o-rings or gaskets, may be employed between the mounting flanges of the outlet portion of the inlet chamber and the throat.

The outer wall 86 of the throat section 36 has a diameter about the same as the diameter of the conical inlet chamber at its outlet portion 22. In one implementation, conical channel 84 transitions into a cylindrical aperture 94 adjacent its outlet portion having a diameter about the same as the diameter of the throat. Although illustrated herein with a constant radius along its length, the throat may be slightly convergent or divergent toward the diffuser chamber 26.

As will be discussed in greater detail below, the inlet cone 80 defines a coaxial cylindrical exit port 28. The exit port is aligned with the axis of the throat section 36 to provide an outlet for the retrograde exit flow 38 of the lighter species of the mixture. The diameter of the exit port may vary depending on a particular implementation. In one example, the diameter of the exit port 28 is slightly less than the diameter of the throat section 36.

From the outlet of the conical channel 84, the mixture flows into the throat section 36. Within the throat section, the mixture transitions from a generally convergent spiraling flow to a fairly uniform spiraling flow moving toward the diffuser section and continues to separate into its component parts. The throat section may be any length, and in one range of particular implementations is from between three and twelve inches. The embodiment of the separator illustrated in FIGS. 2 and 3 has a shorter throat than the embodiment of the separator illustrated in FIG. 5. In addition, the throat section may have any diameter, and in one range of particular implementations has a diameter of between one and two inches. The length and diameter of the throat section may vary in a particular implementation as a function of the number and size of the components of the mixture, the pressure or velocity at which the mixture is forced into the plenum, the angle and length of the conical input channel, the amount of separation required, and other factors.

In an alternative separator (not shown), exhaust ports may be defined in the cylindrical wall 86 of the throat section to remove heavy components. In addition, a variable length throat may be employed. In one example, a variable length throat (not shown) has a first cylindrical sleeve connected with the inlet chamber 20 and a second cylindrical sleeve connected with the outlet or diffuser chamber 26. The sleeves have slightly different diameters such that one sleeve may slide within the other sleeve. As such, the overall length of the throat may be adjusted by moving one sleeve relative to the other. For example, if each sleeve is three inches, then by fully inserting one sleeve within the other the overall length of the throat will be about three inches. By fully separating the sleeves but leaving some portion of one sleeve within the other, a throat length of about six inches may be achieved. Moreover, the throat may be adjusted to any length between three and six inches. In such an embodiment, care should be taken to minimize the boundary edge formed between the two-sleeve section of the throat to avoid causing excessive turbulence.

The outlet side 44 of the throat section 36 is in fluid communication with the diffuser chamber 26. The diffuser chamber defines a conically divergent chamber and has a diffuser cone 30 positioned along the longitudinal axis of the separator and axially at least partially within the conical chamber 26. The conical diffuser chamber includes a continuous conical outer wall 96 that diverges from the outlet side of the throat section. The portion of the conical outer wall adjacent the outlet side of the throat section defines an aperture 98 having a diameter about the same as the diameter of the throat section. Thus, for example, in an embodiment of the separator having a throat section with a diameter of one inch, the diameter of the diffuser section adjacent the inlet of the diffuser section should also be about one inch. As discussed above, in such an implementation, the outlet portion 24 of the inlet chamber 20 and the inlet section of the throat 36 should also have a diameter of about one inch.

In one implementation, the conical side wall 100 of the diffuser cone 30 has about the same angle with respect to the longitudinal axis of the separator as the outer side wall 96 of the diffuser chamber. The conical side wall of the diffuser cone and the conical outer wall of the diffuser define a conical exhaust channel 102 therebetween. The diffuser cone further defines a blunt end 104 at its apex. The blunt end of the diffuser cone is arranged coaxially with the axis of the throat section, and hence the overall longitudinal axis of the separator. Although a blunt shape is preferable, other shapes of the end of the cone are possible.

The blunt end 104 of the diffuser cone 30 is generally positioned near the outlet portion 44 of the throat. In one implementation, the diffuser cone is configured to move along its longitudinal axis. As such, the blunt end of the diffuser cone may be positioned with respect to the outlet section of the throat. Alternatively, in an implementation of the invention without a throat, the blunt end of the diffuser cone may be positioned with respect to the outlet portion 24 of the inlet chamber. Furthermore, the width of the conical exhaust channel 102, i.e., the distance between the conical outer wall 96 of the diffuser chamber and the side wall 100 of the diffuser cone, may be increased or decreased by positioning the diffuser cone away from or toward the throat section, respectively. Such exit cone adjustment will also increase or decrease the annular opening 106 around the exit cone 30 and between the throat 36 and the conical exhaust channel 102. Generally, the diffuser cone may be longitudinally adjusted to change the pressure within the throat and the exit channel and thereby affect the retrograde flow of lighter species out of the exit channel 28.

The separation of the mixture occurs due, in part, to the large centrifugal-like forces acting on the mixture as it spirals down the conical input channel 84 and along the throat section 36. Within the throat section, the heavier species of the mixture collect adjacent the outer cylindrical side wall 86 and the lighter species collect near the longitudinal axis of the throat. At the outlet section of the throat, the heavier species spiral into the divergent conical diffuser channel 102. The lighter species encounter the region adjacent the blunt end 104 of the exit diffuser cone 30.

Upon opening a valve 108 to the exit port 28, the lighter species flow out of the separator in a flow 38 that is contrary to the flow (32, 34) of the mixture through the conical inlet channel and the outer flow 40 in the throat. Typically, pressure within the separator will be higher than atmospheric pressure. The valve will open the exit port to a pipe or other conduit that is at or near atmospheric pressure which will help facilitate a retrograde flow of the lighter species or component(s) collected along the axis of the throat, but will allow the heavier species collected along the side wall of the throat to flow out through the diffuser channel. Incomplete separation, minor turbulence, and other factors may cause some lighter species components to flow through the diffuser channel 102 along with the heavier species, and may cause some heavier species to flow out of the exit port 28 along with the lighter species. Within the retrograde flow in the throat, further separation also occurs as the flow continues to spiral. In the retrograde flow, some heavier species merge with the heavier species in the outer exhaust flow and thus change direction and are exhausted.

At the output of the diffuser channel 110, the outer conical diffuser wall defines a mounting flange 112. A disk-shaped exhaust plate 114 is bolted to the mounting flange. An annular exhaust channel is defined by a rear wall 116 of the diffuser cone and the plate 114. The rear plate further defines one or more cylindrical apertures or outlet ports 118 adapted to be connected with whatever storage vessel 120 or other component the heavier material or materials that exit through the diffuser cone will be stored in.

To provide for axial movement of the diffuser cone 30, it may be movably mounted within the diffuser chamber 26 on one or more posts 122. In the implementation illustrated herein in FIG. 5, four posts are mounted to the back plate 114. In addition, a screw drive motor 124 or other similar type device capable of providing fine axial adjustment of the cone is operably connected with the diffuser cone 30 so that it may be axially adjusted within the diffuser chamber.

Various components and parameters of the separator may be adjusted to cause the most efficient separation for a particular mixture. The implementation of the separator illustrated herein provides for an interchangeable inlet portion 20, throat 36 and diffuser section 26. Examples of adjustable or configurable components and parameters include the angle of convergence of the inlet channel 84, the angle of divergence of the diffuser channel 102, the length of the inlet channel, the pressure at which a mixture is fed into the separator, the length of the throat section 36, the diameter of the throat section and the respective cooperating output and inputs of the outlet channel and the diffuser channel, the diameter of the exit port 28, and the position of the diffuser cone 30 within the diffuser chamber.

In the field, the diffuser cone 30 is, in some instances, movably mounted along the axis of the separator. The movable diffuser cone allows the position of the blunt end 104 and the size of the diffuser channel 102 to be changed. In addition, in an implementation where the mixture is fed into the separator by way of a pump, the pressure and input velocity of the mixture into the plenum may also be adjusted. In some uses, such as in water treatment where contaminants are evenly and fairly uniformly distributed, the separator may be optimized in the field once for maximum separation, and then left alone. In other implementations where the portions of components of a mixture may vary, it may be advantageous to provide a control system to monitor the ratios of the components being exhausted through the exhaust and the components being transmitted from the exit channel, and make appropriate adjustments to the pressure of the mixture, the position of the diffuser cone, or both.

Figure 6:
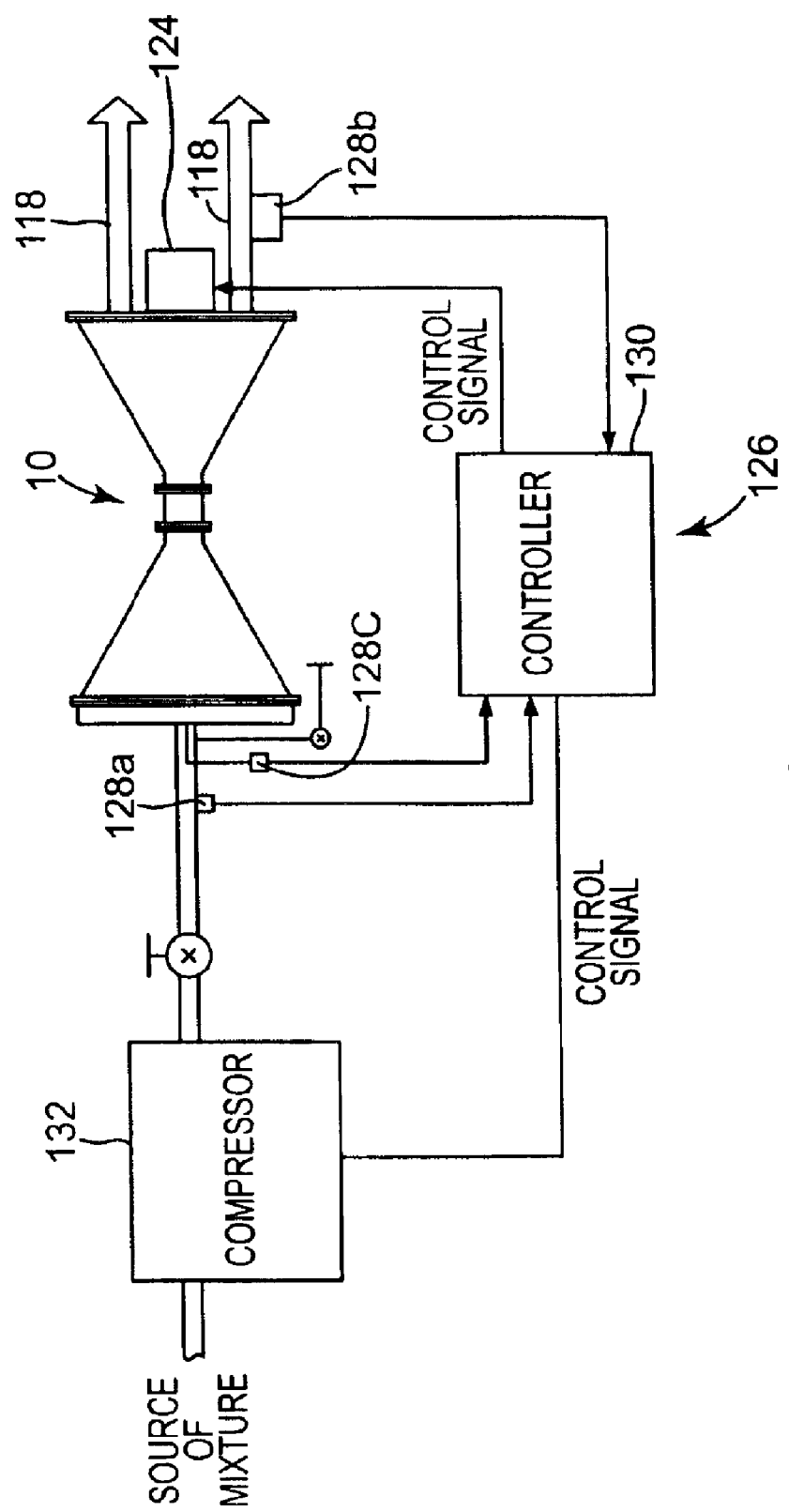
FIG. 6 is a block diagram illustrating one example of a control system for use with a separator, in accordance with the present invention.

In one implementation shown in FIG. 6, a control system 126 employing a saddle point type optimization may be employed. It will be recognized that various commercially available sensors and processors exist for measuring and analyzing gasses, liquids, and solids, which may be employed in a saddle point type control system. In the control system illustrated in FIG. 6, a sensor (128 a, b, c) is placed in the flow path of the mixture into the separator (128a), in the flow path of the exhaust (128b) and in the flow path of the exit channel (128c). These sensors are each connected with the controller 130 to provide data with regard to the composition in each of the parts of the flow path. The controller also includes outputs, or control lines, to the compressor 132 and the diffuser cone motor 124. Using saddle point optimization, the controller 130 may alter the input pressure or the diffuser cone location or both, and analyze the mixture at the various sensor locations to determine if separation is improved. The controller may continue to make pressure changes, cone changes, or both to optimize separation. In addition, control lines may be connected with the input valve and output valve to change the pressure within the separator, the input velocity of the mixture, and other parameters.

In mixtures having more than two species, in some arrangements, multiple separators 10 may be employed in series to separate one species per separator. For example, a first separator may be configured so that only the heaviest species passes into the diffuser channel 102, and two lighter species flow through the exit port 28. The exit port may then be connected with a pump to feed the mixture of the two remaining species into a second separator configured to separate the remaining heavier species from the remaining lighter species.

Some prior art mixture separation devices utilize gravity to move the mixture from an inlet through to an outlet. A separator 10 in accordance with the present may be used in any position, such as horizontally (as shown in FIGS. 1 and 2), or vertically either with the plenum positioned above the separator or below the separator.

Figure 7:
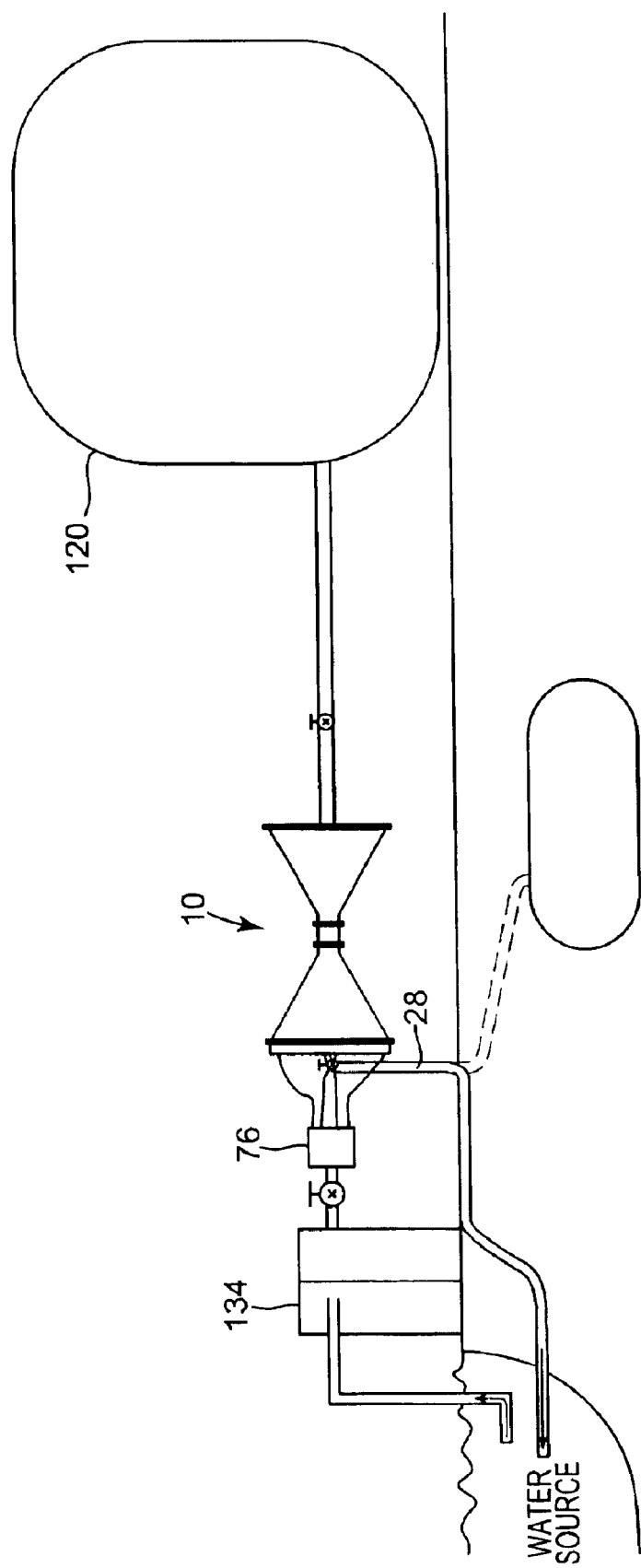
FIG. 7 is a diagram illustrating an embodiment of the invention for use in removing contaminants from a water source.

FIG. 7 is a diagram depicting the separator connected with a liquid pump 134 configured to provide liquid under pressure to the separator 10. In one particular implementation, the separator is connected to a water pump configured to pump water containing contaminants such as arsenic, iron, copper, lead, zinc, and cadmium, and the like into the separator in order to remove the contaminants. From the separator, the cleansed water flows from an exit port 28 and a slurry of one or more contaminants flow from the exhaust outlet port 118. The exhaust port may be connected with a tank 120 or other storage facility for proper disposal or further processing of the contaminants. The cleansed water may be returned to its source or transferred to some other destination. In some instances, the water may not be fully cleansed and thus contain some contaminants.

The invention is described in detail above with reference to various embodiments thereof, with some aspects of the invention being described in the accompanying drawings. Numerous specific details are set forth in order to provide a thorough understanding of the invention. However, it will be apparent to those skilled in the art that the invention may be practiced without some or all of the specific details, that operations may be rearranged, that some operations may be eliminated or performed in a different way, and that other changes may be made without departing from the spirit and scope of the present invention.

We claim:

1. A separator for partially or completely separating components of a mixture comprising:
   a plenum;
   a first chamber defining a convergent flow path;
   a second chamber fluidly connected with the first chamber, the second chamber defining a divergent exhaust flow path;
   an exit channel at least partially contained within the first chamber and operably associated with the first chamber and the second chamber;
   the plenum further comprising:
   a first annular channel defining at least one input port;
   a second annular channel fluidly connected with the first chamber; and
   at least one transfer port connected between the first annular channel and the second annular channel at an acute angle.

2. The separator of claim 1 wherein the plenum is configured to provide a circular flow of the mixture.

3. The separator of claim 1 wherein the second chamber further comprises a diffuser cone.

4. The separator of claim 3 wherein the diffuser cone is arranged to provide divergent exhaust flow path that is confined within a divergent conical channel.

5. The separator of claim 1 wherein the first chamber further comprises an inlet cone.

6. The separator of claim 5 wherein the inlet cone is arranged to provide a convergent flow path that is confined within a convergent conical channel.

7. A fluid separator comprising:

means for establishing a vortex flow from an applied fluid comprising heavier molecular weight matter and lighter molecular weight matter, the vortex flow having a periphery and direction of propagation, and becoming stratified in the direction of propagation into the heavier molecular weight matter at the periphery and the lighter molecular weight matter away from the periphery;

means for impeding the vortex flow to induce the lighter molecular weight matter to flow through an interior of at least a portion of the vortex flow as a retrograde flow in a direction opposite the direction of propagation, the heavier molecular weight matter continuing as a forward flow in the direction of propagation;

means for removing the retrograde flow from the interior of the vortex flow;

means for exhausting the retrograde flow from the removing means to obtain a first separated fluid; and means for exhausting the forward flow to obtain a second separated fluid.

* * * * *